Sept. 14, 1948.  A. C. WICKMAN  2,449,354
MACHINE FOR GRINDING TOOTHED
GEAR WHEELS AND THE LIKE
Filed March 14, 1946
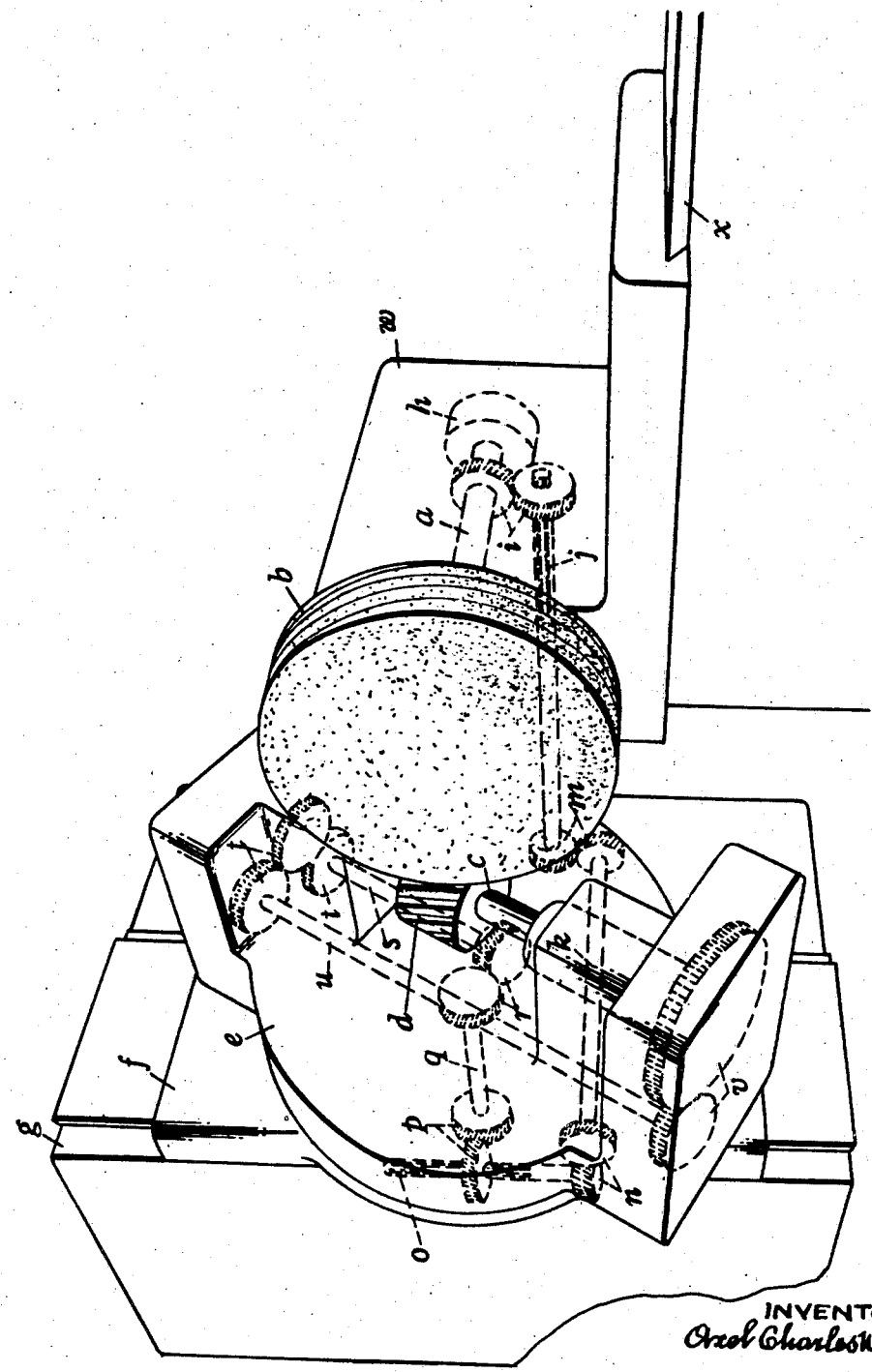
INVENTOR.
Orzol Charles Wickman
BY
Stanley Lightfoot
ATTORNEY.

Patented Sept. 14, 1948

2,449,354

UNITED STATES PATENT OFFICE 2,449,354

MACHINE FOR GRINDING TOOTHED GEAR WHEELS AND THE LIKE

Axel Charles Wickman, Coventry, England

Application March 14, 1946, Serial No. 654,259
In Great Britain March 30, 1945

1 Claim. (Cl. 51—71)

This invention relates primarily to machines for grinding the teeth of helically toothed gear wheels, by means of a grinding wheel having an operative peripheral surface of helical form. But it may be applied to machines for other analogous uses, such as the grinding of helical splined shafts, or other shaped work pieces capable of being treated by rotational engagement with the grinding wheel.

In the grinding of toothed wheels by means of a helically formed grinding wheel, it is already known to interconnect the work piece and the grinding wheel by gearing for effecting relative rotation at appropriate rates. It is also known to employ grinding wheels of substantial axial length in order to minimise the rate of wear of the wheels, and to provide relative movement between the work piece and the grinding wheel in a direction parallel with the axis of the grinding wheel, or at right angles thereto, or in both such directions. But hitherto in order to permit such translational movements it has been necessary to combine with the machine a compensatory mechanism in order to maintain the proper relative rotational rates of the work piece and grinding wheel.

The object of the present invention is to enable the previous need for compensatory mechanisms to be avoided, and thereby effect a desirable simplification in the construction of the machines.

The accompanying diagram illustrates one mode of carrying the invention into effect.

Referring to the diagram, I employ a spindle $a$ for carrying a grinding wheel $b$ of appropriate diameter and length and having a helically formed peripheral surface. Also I employ another spindle $c$ for carrying the work piece $d$, this spindle being mounted on a supporting member $e$ which can be adjusted angularly so as to enable the spindle to be set at such an angle in relation to the axis of the grinding wheel that the tooth faces to be ground are substantially in line with the operative surfaces of the grinding wheel.

The supporting member $e$ is carried by, and (as above mentioned) is angularly adjustable on, a slide $f$ which is movable on a fixed guide $g$ in a direction parallel with the tooth faces to be ground, the slide being operable by any convenient mechanism (not shown). The two spindles $a$, $c$ are interconnected by gearing so that the work piece can be rotated relatively to the grinding wheel at a rate corresponding to that which would result if the work piece and grinding wheel were a pair of complementary gear wheels. In the example illustrated motion is imparted to the shaft $a$ from any convenient source, connected directly to the shaft or through a belt acting on a pulley $h$. The shaft $a$ is connected by gear wheels $i$ to a shaft $j$, and the latter drives a shaft $k$ through gear wheels $m$. From the shaft $k$ the motion is taken through gear wheels $n$ to a splined shaft $o$ and thence through gear wheels $p$, shaft $q$, gear wheels $r$ to a shaft $s$. From this shaft the motion is transmitted through gear wheels $t$, shaft $u$ and gear wheels $v$ to the shaft $c$ carrying the work piece.

The grinding wheel $b$, in the example shown, is carried by a slide $w$ mounted on a base $x$.

In the grinding operation the rotating work piece is moved at an appropriate feed rate in a direction parallel with the tooth faces, and this movement, combined with the rotational movement, causes the work surfaces to be subjected to the action of the grinding wheel through their length. Also this relative movement of the work piece and grinding wheel causes successive parts of the length of the surfaces to be ground to be acted upon by different parts of the operative surface of the grinding wheel.

By this invention I am able to provide a machine for the purpose specified in a relatively simple form. This invention is not, however, restricted to the example described, as subordinate details may be modified to suit different requirements. Also, as already stated, the machine may be employed for treating other analogous work pieces.

Having thus described my invention, what I claim as new and desire to secure by Letters Patent is:

A machine for grinding the teeth of helically toothed gear wheels or other analogous work pieces by a grinding wheel having an operative peripheral surface of helical form, and comprising the combination of a grinding wheel spindle, a work spindle, an angularly adjustable support on which the work spindle is mounted and by which the work spindle can be set at such an angle in relation to the axis of the grinding wheel that the work piece surfaces to be ground are substantially in alinement with the operative surfaces of the grinding wheel helix, gearing for interconnecting the two spindles in constant speed relationship so that relative rotation thereof occurs at the rate which would result if the work piece derived its rotation from the grinding wheel, a slide carrying the angularly adjustable work spindle support, and a fixed guide along which the slide is movable for effecting translational movements of the work spindle support relatively to the grinding wheel spindle in a direction parallel with the work piece surfaces to be ground.

AXEL CHARLES WICKMAN.

REFERENCES CITED

The following references are of record in the file of this patent:

UNITED STATES PATENTS

| Number | Name | Date |
| --- | --- | --- |
| 2,307,238 | Ross | Jan. 5, 1943 |
| 2,424,191 | Rickenmann | July 15, 1947 |

FOREIGN PATENTS

| Number | Country | Date |
| --- | --- | --- |
| 520,557 | Great Britain | Apr. 26, 1940 |